United States Patent [19]
Presti et al.

[11] Patent Number: 6,056,852
[45] Date of Patent: May 2, 2000

[54] RETREADING WICK AND METHOD OF MANUFACTURE

[75] Inventors: Barry W. Presti, Doylestown; Darryl C. Presti, Chalfont; H. C. Dewey, Lansdale, all of Pa.

[73] Assignee: Presti Rubber Products Inc., New Britain, Pa.

[21] Appl. No.: 09/046,357

[22] Filed: Mar. 23, 1998

[51] Int. Cl.[7] .................................................. B29D 30/56
[52] U.S. Cl. ......................... 156/394.1; 156/87; 156/96; 156/909; 264/257; 425/17
[58] Field of Search ................... 156/394.1, 96, 156/87, 130.3, 285, 286, 909; 425/17; 264/36.14, 257

[56] References Cited

U.S. PATENT DOCUMENTS

| | | | |
|---|---|---|---|
| 3,745,084 | 7/1973 | Schelkmann | 156/96 |
| 4,185,056 | 1/1980 | Detwiler | 264/36.14 |
| 4,500,375 | 2/1985 | Goldstein | 156/96 |
| 5,007,978 | 4/1991 | Presti . | |
| 5,098,268 | 3/1992 | Robinson . | |
| 5,173,353 | 12/1992 | Yamamoto . | |
| 5,306,130 | 4/1994 | King et al. . | |
| 5,882,471 | 3/1999 | Chandler et al. | 156/394.1 |

*Primary Examiner*—Geoffrey L. Knable
*Attorney, Agent, or Firm*—Howson and Howson

[57] ABSTRACT

A wick for use in forming a vacuum between a curing envelope and a tire during a tire retreading process, and a method for the manufacture of the wick. The wick is provided by a pad of rubber reinforced with a stretchable fabric material and engagable with a valve which extends through the curing envelope. The wick has a face with a pattern of grooves forming a network of gas passageways to the valve to ensure complete evacuation of all gases when the vacuum is drawn between the curing envelope and tire. The method of manufacture of the wick includes locating unvulcanized rubber and fabric material between a pair of mold dies, and closing the mold dies to form the pad and simultaneously embed the fabric within the rubber. In addition, one of the mold dies form a network of grooves in one of the faces of the pad.

21 Claims, 4 Drawing Sheets

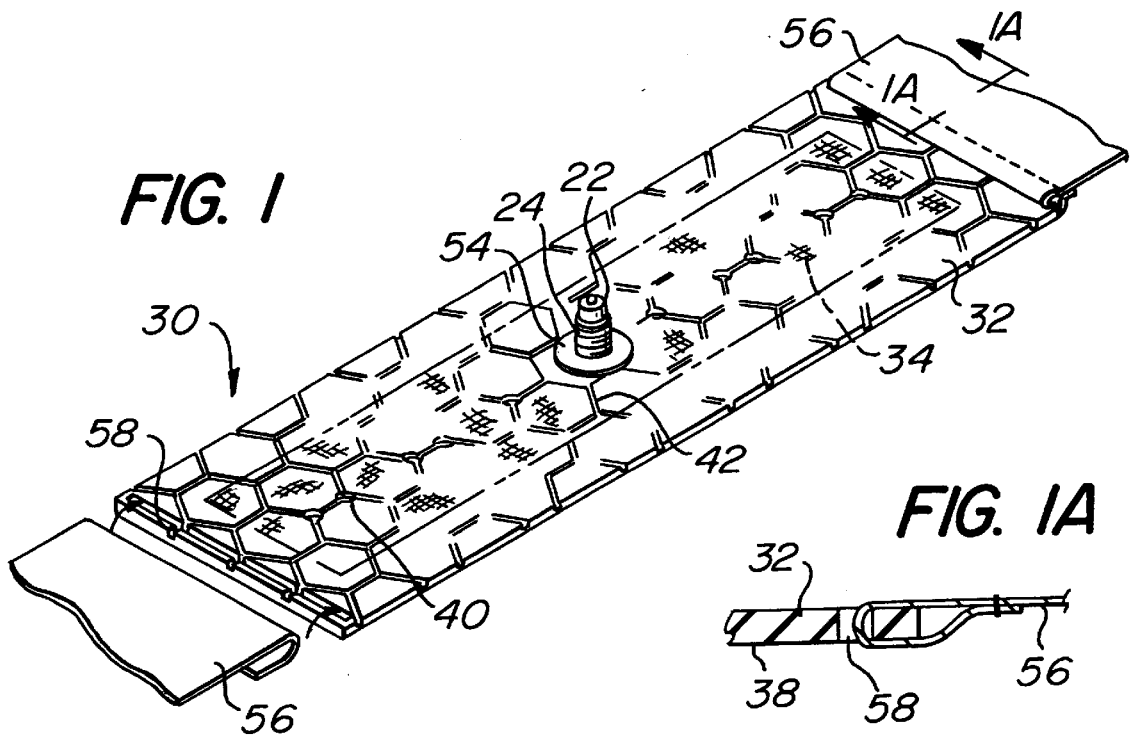
FIG. 1
FIG. 1A
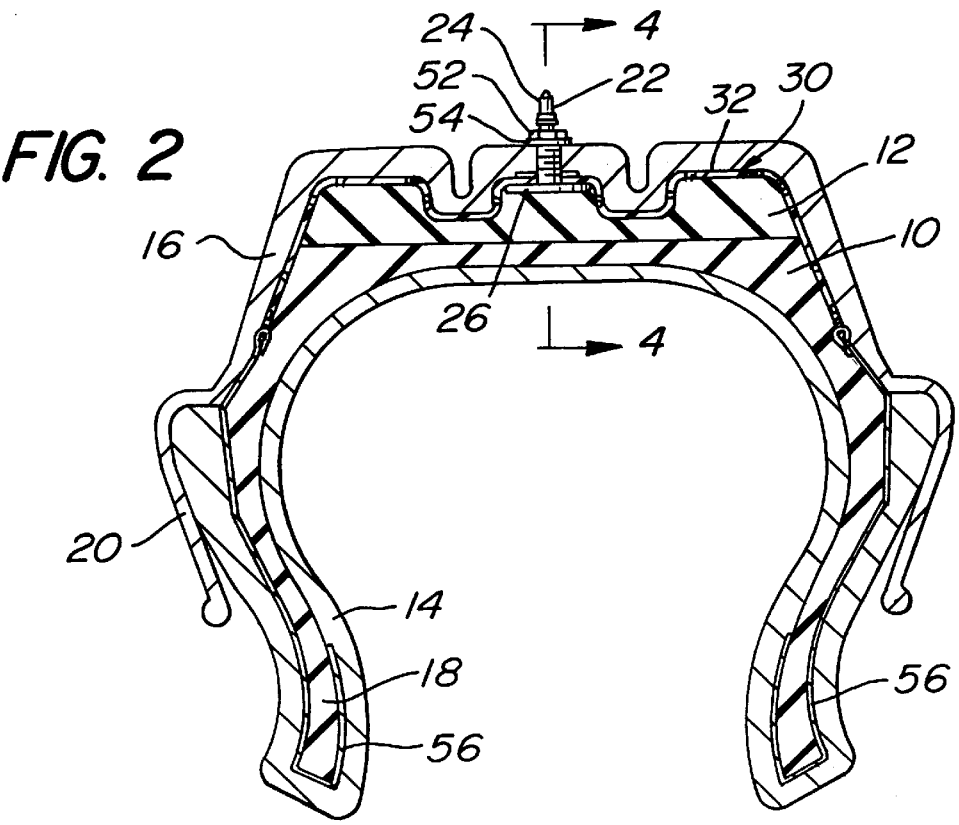
FIG. 2

RETREADING WICK AND METHOD OF MANUFACTURE

FIELD OF THE INVENTION

The present invention relates generally to tire retreading, and more particularly, the present invention relates to a wick for use in forming a vacuum between a curing envelope and a tire.

BACKGROUND OF THE INVENTION

Examples of processes for retreading a tire are discussed in the present assignee's U.S. Pat. No. 5,007,978 issued to Presti and U.S. Pat. No. 5,098,268 issued to Robinson. Worn tread on a used tire casing is buffed off to a profile suitable for mounting a new tread. Then, a pre-cured and buffed tread is adhered about the periphery of the casing with a lamina of uncured cushion gum cemented between the tread and the casing. The tire is encased within curing envelopes and a vacuum is drawn through a valve in the curing envelopes for stretching the envelopes into intimate contact with all surfaces of the tread. The tire is then placed in an autoclave for several hours at an elevated temperature and pressure to cure the gum and positively bond the casing and tread together. The curing envelopes are removed and the retreaded tire is ready for use.

An important step in the above-described tire retreading process is the formation of a vacuum between the curing envelopes and the tire. The vacuum ensures that air or steam does not penetrate into the cushion gum during curing of the gum because the presence of air bubbles, or pockets of air, between the curing envelopes and the tire will prevent proper curing of the gum and will cause tread distortion. In addition, air pockets prevent pressure from being uniformly applied over the entire bonding area which also causes tread distortion.

To eliminate the formation of air pockets and to ensure the complete evacuation of air from between the curing envelopes and the tire, the present assignee has long suggested to its customers the placement of a wicking material between the curing envelopes and the tire. The recommended wicking material was a strip of multiple ply nylon.

U.S. Pat. No. 5,173,353 issued to Yamamoto also discloses placing a strip of nylon cloth between a curing envelope and tire for the purpose of venting air. See column 1, lines 14–16 and 27–30 of Yamamoto. In addition, Yamamoto discloses an air venting belt made of an expansible woven cloth such as rubber yarn. The end portions of the belt are laminated with a smooth film so that the end portions of the cloth which overlap the sidewall of the tire do not cause cloth-type imprints to be formed on the smooth sidewalls of the tire.

Another method of venting air between a curing envelope and a tire is disclosed in U.S. Pat. No. 5,306,130 issued to King et al. King provides the inside surface of the curing envelope with a plurality of air passageways.

Although various ones of the above-referenced retreading wicks or means to vent air between a curing envelope and a tire may be satisfactory for their intended purposes, there is a need for an improved re-usable retreading wick which is durable and inexpensive to manufacture in addition to preventing air pockets from forming between a curing envelope and a tire when a vacuum is drawn.

OBJECTS OF THE INVENTION

With the foregoing in mind, a primary object of the present invention is to provide a novel retreading wick which in use prevents the formation of air pockets between a curing envelope and a tire.

Another object of the present invention is to provide an improved retreading wick which is readily positionable relative to the curing envelopes, tire and valve, and which is easy to use.

A further object of the present invention is to provide a retreading wick having improved durability so that it is capable of re-use over an extended period.

A still further object of the present invention is to provide a unique and inexpensive method of manufacturing a reinforced retreading wick.

SUMMARY OF THE INVENTION

More specifically, the present invention provides a wick for use in forming a vacuum between a curing envelope and a tire during retreading of the tire. In use, the wick is designed to be located between the curing envelope and an outer surface of the tire adjacent a valve which extends through the curing envelope for drawing the vacuum.

The wick comprises a thin, elongate, elastomeric pad reinforced with a fabric material. One side of the pad has a smooth surface and the other side of the pad is provided with a plurality of grooves which form a plurality of air passageways to the valve. Preferably, in use, the smooth surface of the pad faces and confronts the tire.

Another aspect of the present invention provides a method of manufacturing a reinforced retreading wick. Unvulcanized rubber and a fabric material are placed between a pair of mold dies. The mold dies are closed to mold the tire retreading wick such that the fabric material is embedded within the rubber. An inner face of one of the mold dies has a series of upstanding ribs which form a plurality of grooves in one face of the rubber when molded. The opposite side of the rubber is formed with a smooth surface.

BRIEF DESCRIPTION OF THE DRAWINGS

The foregoing and other objects, features and advantages of the present invention should become apparent from the following description when taken in conjunction with the accompanying drawings, in which:

FIG. 1 is a perspective view of a retreading wick embodying the present invention, the figure illustrating the preferred relative positioning of a valve and a surface of the retreading wick having grooves;

FIG. 1A is a cross-sectional view of the retreading wick illustrated in FIG. 1 taken along the line 1A—1A;

FIG. 2 is a cross-sectional view of the retreading wick illustrated in FIG. 1 used in a tire retreading assembly which utilizes both inside and outside curing envelopes;

DETAILED DESCRIPTION OF THE PREFERRED EMBODIMENT

Figure 6:
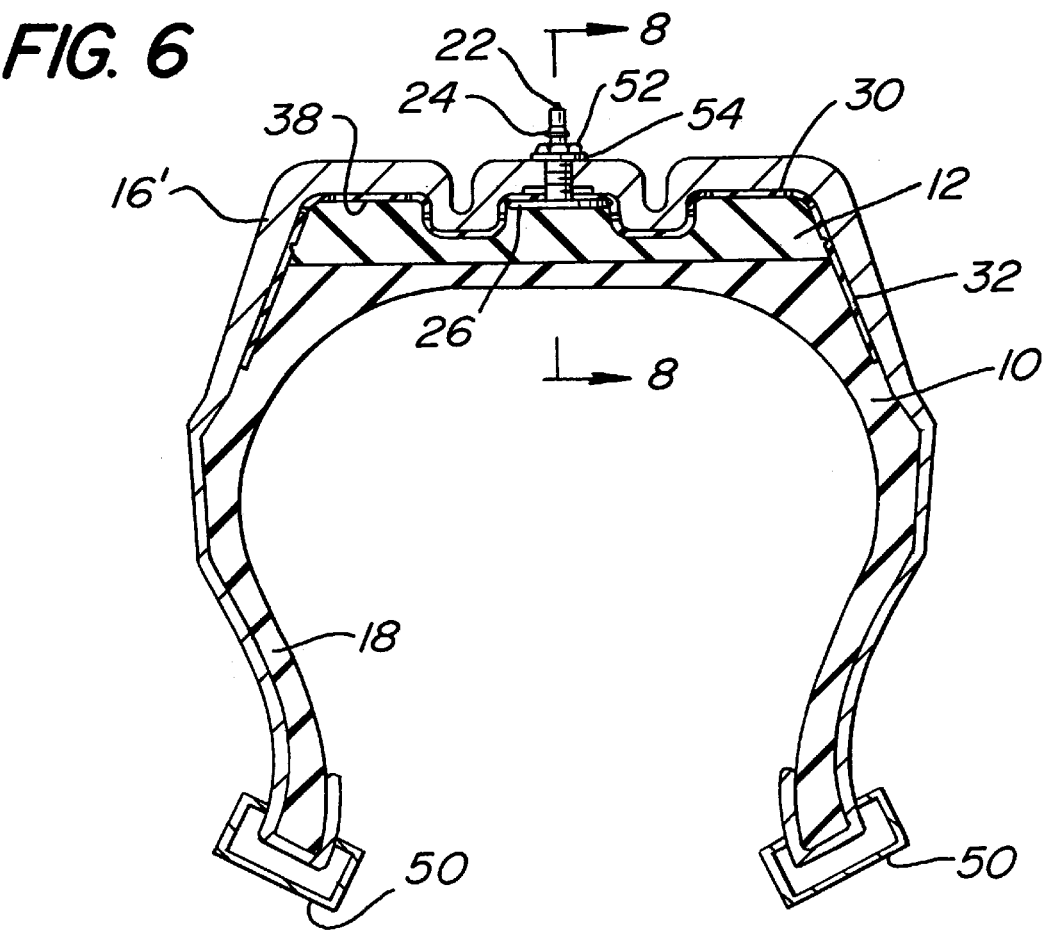
FIG. 6 is a cross-sectional view of the retreading wick illustrated in FIG. 5 used in an alternate tire retreading assembly which utilizes only an outside curing envelope.

As discussed above, tires having worn treads can be retreaded for re-use. FIGS. 2 and 6 illustrate a casing 10 of a worn tire in which old worn tread (not shown) has been removed and replaced with a strip of new pre-cured tread 12. The tread 12 is adhered to the outer periphery of the casing 10 with a lamina of uncured cushion gum (not shown) cemented between the tread 12 and the casing 10. When the gum is cured, the tread 12 is permanently attached to the casing 10.

As stated above, examples of systems for retreading tires are disclosed in the present assignee's U.S. Pat. No. 5,007,978 issued to Presti and U.S. Pat. No. 5,098,268 issued to Robinson. The disclosure of both these patents are incorporated herein by reference.

FIG. 2 illustrates a tire retreading system which utilizes both inside and outside curing envelopes. As illustrated, the tire casing 10, new tread 12 and uncured gum are encased within an inside curing envelope 14 and an outside curing envelope 16 before being placed within an autoclave. The reusable curing envelopes, 14 and 16, are made of a durable high-heat resistant synthetic rubber and are formed in the exact shape of the specific tire being retreaded. The inside curing envelope 14 snugly fits over the entire inside of the tire casing 10 and over a portion of the sidewall 18 of the tire casing 10. The outside curing envelope 16 fits over the tread 12 and along the sidewall 18 of the casing 10. The outside curing envelope 16 has a skirt 20 which overlaps a portion of the inside curing envelope 14 and which forms an air tight seal between the curing envelopes, 14 and 16.

FIG. 6 illustrates a tire retreading system which utilizes only an outside curing envelope. As illustrated, the tire casing 10, new tread 12 and uncured gum are encased within an outside curing envelope 16' before being placed within an autoclave. The outside curing envelope 16' fits over the tread 12, extends along the sidewall 18 of the casing 10, and is sealed to the tire casing 10 at the end of the sidewall 18 by a pressure sealing means 50.

Figure 5:
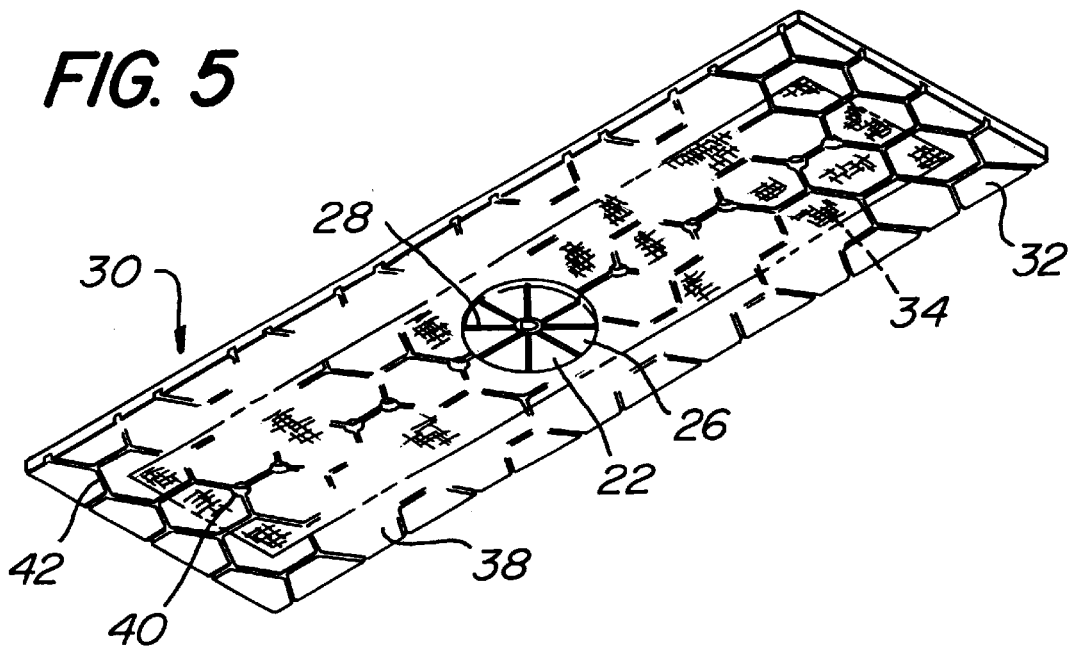
FIG. 5 is a perspective view of an alternate arrangement of the valve and the grooved surface of the retreading wick.

After the curing envelopes, 14 and 16, or curing envelope 16', are positioned to encase the tire casing 10, tread 12 and uncured gum (not shown), a vacuum is drawn between the curing envelope(s) and the tire casing and tread. To this end, a valve 22 made for instance, of metal or plastic, extends through the outside curing envelope 16 or 16' and is connected to a pump (not shown) for drawing a vacuum. The valve 22 has a substantially hollow cylindrical stem 24 and a substantially disc-shaped base 26 which extends transversely from the terminal end of the stem 24. As shown in FIG. 5, the base 26 has a plurality of radially extending grooves 28 extending from the outer periphery of the base 26 to the hollow stem 24 to provide a series of air passageways. In use, the base 26 is located between the outer curing envelope 16, or 16', and the tread 12, and the stem 24 extends through the outside curing envelope 16, or 16'. Preferably, a nut 52 and washer 54 are utilized on the valve stem 24 opposite the base 26 to add compression and form an air-tight seal.

Figure 4:
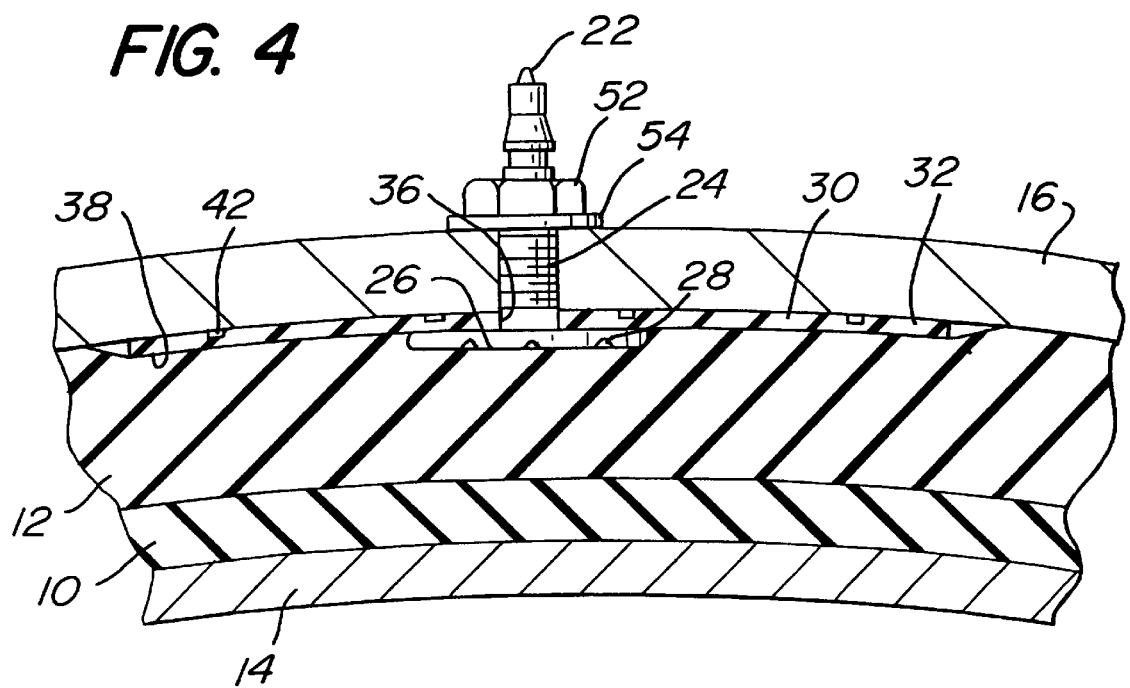
FIG. 4 is a cross-sectional view of the tire, curing envelopes and retreading wick illustrated in FIG. 2, the view taken along the line 4—4 of FIG. 2.
Figure 8:
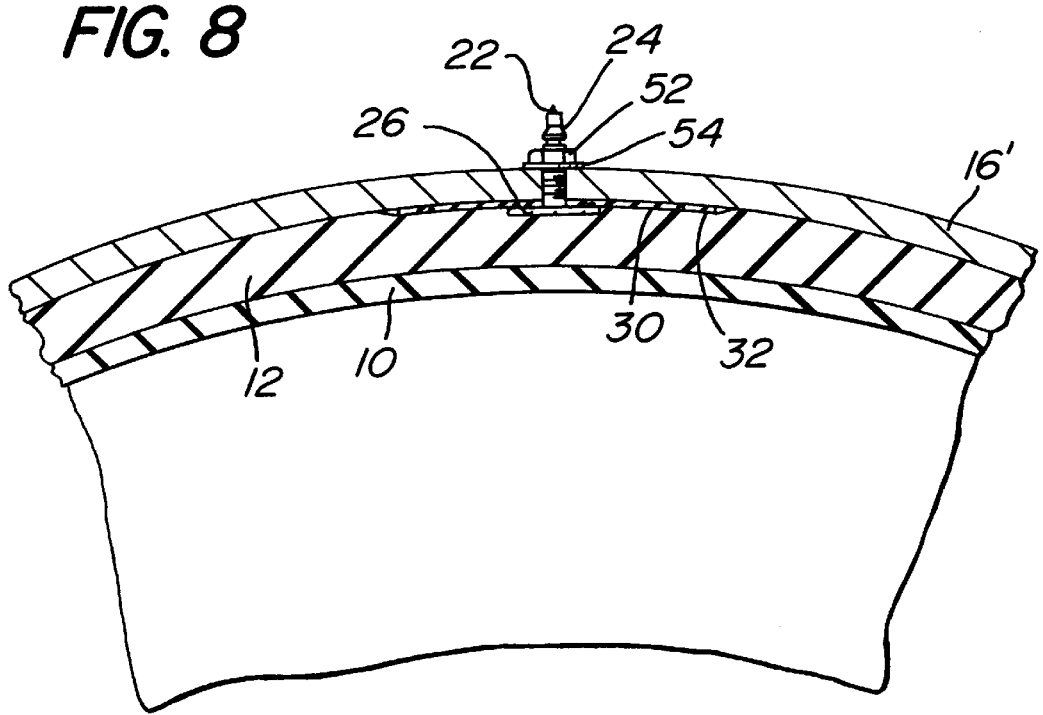
FIG. 8 is a cross-sectional view of the tire, curing envelopes and retreading wick illustrated in FIG. 6, the view taken along the line 8—8 of FIG. 6.

It is important for proper curing that all air between the curing envelopes, 14 and 16, or alternatively the curing envelope 16', and the tire casing 10 and tread 12 be evacuated and that formation of air pockets be prevented. Thus, according to the present invention, a retreading wick 30 is positioned between the outside curing envelope 16, or 16', and the tread 14 adjacent the valve 22 to ensure the complete evacuation of air and to prevent formation of air pockets. As best illustrated in FIGS. 4 and 8, the wick 30 is relatively small, overlays only a small area of the tread 12 adjacent the valve 22, and extends across the tread 12 and partially down the sidewall 18 of the tire casing 10.

As illustrated in FIGS. 1 and 5, the wick 30 of the present invention is a thin, elongate rubber pad 32 having an embedded reinforcing fabric material 34. The embedded fabric 34 is preferably a stretchable type of fabric since the wick 30 must be capable of snugly conforming to the shape of many different tire tread patterns and is intended for reuse over a long life span. The fabric is preferably stretchable in both the longitudinal and transverse direction of the fabric. For example, the fabric 34 can be multi ply woven or knitted nylon.

The wick 30 is designed to be positioned at the location of the valve 22 and to co-operatively engage the valve 22. To this end, the wick 30 has a centrally located aperture 36 through which the valve stem 24 extends. The aperture 36 extends through an area of the rubber pad 32 where the fabric 34 is embedded so that this area of the rubber pad 32 is reinforced. The base 26 of the valve engages a tire confronting face 38 of the wick 30 so that the base 26 of the valve 22 is located between the tread 12 and the wick 30. Preferably, the tire confronting face 38 of the wick 30 has a smooth surface. The wick also has several other apertures 40 which are offset from the aperture 36 and which ensure that, when a vacuum is drawn, the outside curing envelope 16, or 16', is drawn tightly into engagement with the wick 30.

Figure 3:
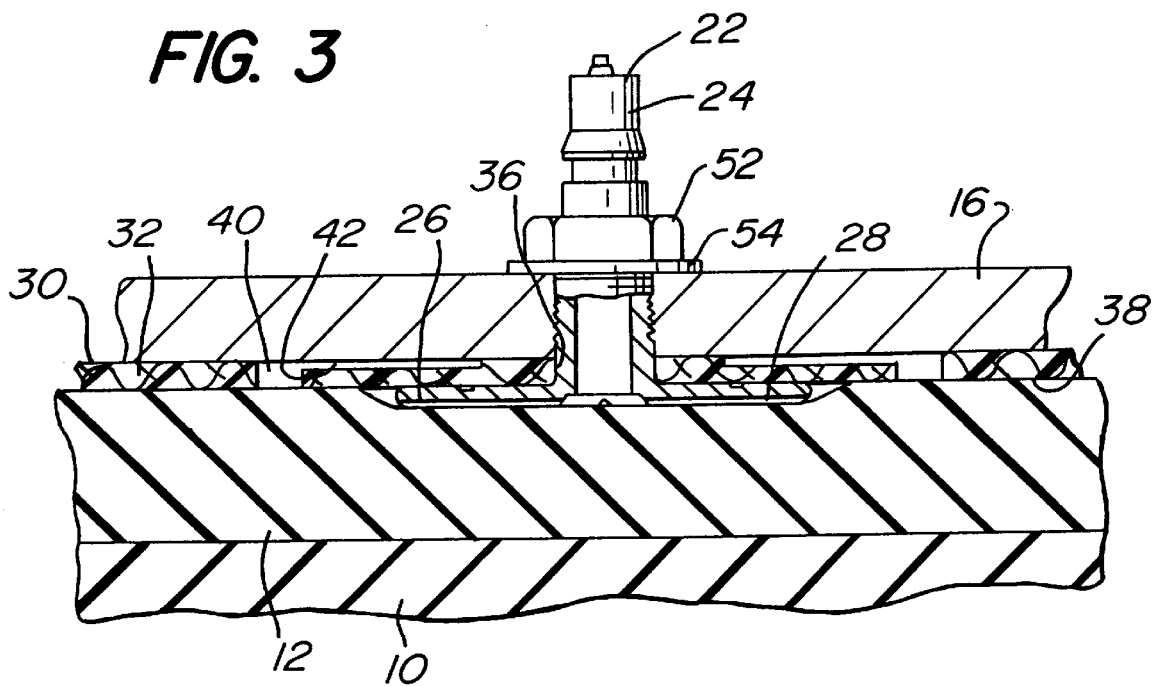
FIG. 3 is a cross-sectional view of the tire, curing envelope, and retreading wick adjacent the valve, wherein the smooth surface of the wick confronts the tire.
Figure 7:
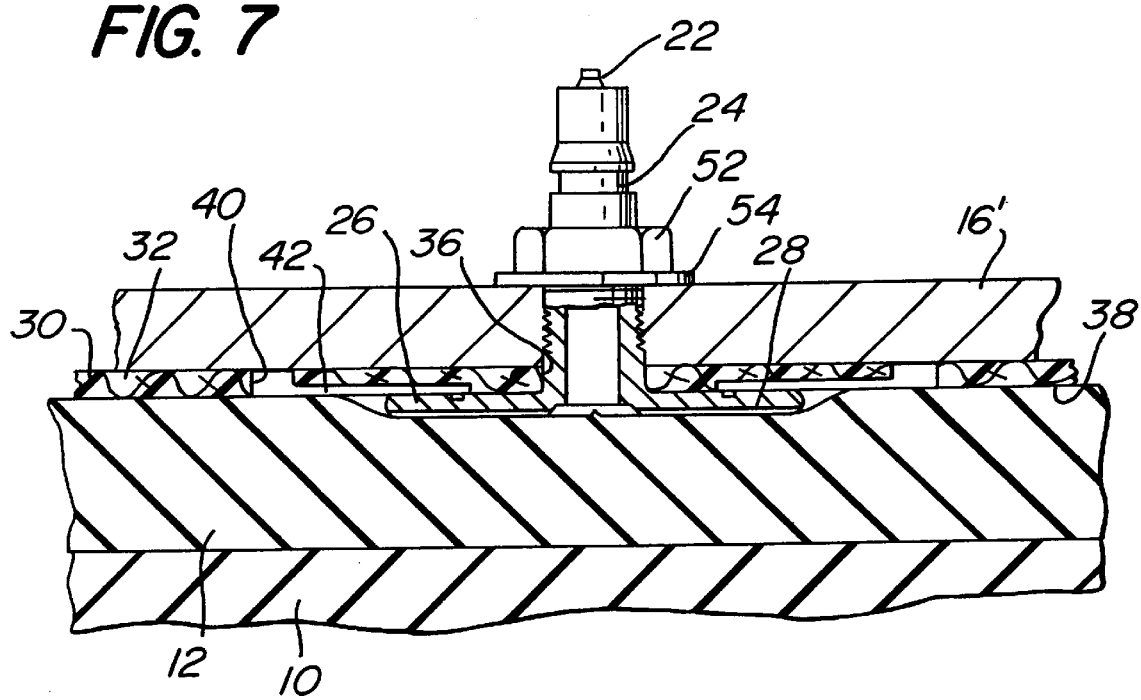
FIG. 7 is a cross-sectional view of the tire, curing envelope, and retreading wick adjacent the valve, wherein the grooved surface of the wick confronts the tire.

One side of the wick 30 is configured to ensure that no blockages of gas occur adjacent the vicinity of the valve 22. To this end, one side of the wick 30 has a plurality of grooves 42 forming a network of air passageways between either the wick 30 and the outside curing envelope as shown in FIG. 3, or the wick 30 and the tread 12 as shown in FIG. 7. The grooves 42 can be formed in any pattern which provides a grid-like network of intersecting air passageways; however, as illustrated in FIGS. 1 and 5, preferably the grooves 42 are formed in an interconnecting regular repeating pattern such as provided by an array of closely spaced geometric forms such as hexagons.

In use, as shown in FIG. 2, the wick 30 engages the stem 24 and base 26 of the valve 22. The valve stem 24 is then inserted through the outer curing envelope 16, and the outer curing envelope 16, wick 30 and valve 22 are wrapped around the tire casing 10, tread 12 and uncured gum (not shown) so that the curing envelopes 14 and 16 completely encase the casing and new tread. As illustrated, the wick 30 extends down a portion of the sidewall 18 of the tire casing 10. Also as illustrated, an optional cloth 56 extends from the ends of the wick 30 down the remaining portion of the sidewall 18 to the inside lip of the casing 10. The cloth 56 provides a path for gas from within the inside curing envelope 14 to the wick 30. Use of cloth 56 is optional; wick 30 could be utilized without cloth 56.

A vacuum is drawn through the valve 22 so that the curing envelopes 14 and 16 are stretched into intimate contact with all casing 10 and tread 12 surfaces. The wick 30 conforms to the contour of the outer surface of the treads 12, including the surface of grooves in the tread and is capable of providing passageways for air, or other gases, vapor, etc., to flow to the valve 22 to prevent any air pockets from being isolated from the valve 22 by means of the network of grooves 42 in the wick 30. Preferably, the smooth surface of the wick 30 faces the tread 12 as shown in FIG. 3; alternatively, the grooved surface of the wick 30 can face the tread 12. After the tire casing has been retreaded, the wick 30 and cloth 56, if used, can be removed and reused in the retreading of another tire casing.

In use with a different retreading system, as shown in FIG. 6, the wick 30 engages the stem 24 and base 26 of the valve 22. The valve stem 24 is then inserted through the outer curing envelope 16', and the outer curing envelope 16', wick 30 and valve 22 are wrapped around the tire casing 10, tread 12 and uncured gum (not shown). As illustrated, the wick 30 extends down a portion of the sidewall 18 of the tire casing 10, and the outer curing envelope 16' is sealed to the lip of the tire casing 10 by a pressure sealing means 50. A vacuum is drawn through the valve 22 so that the curing envelope 16' is stretched into intimate contact with casing 10 and tread 12. The wick 30 conforms to the contour of the outer surface of the tread 12 and is capable of providing passageways for air, or other gases, vapor, etc., to flow to the valve 22 to prevent any air pockets from being isolated from the valve 22 by means of the network of grooves 42 in the wick 30. Preferably, the smooth surface of the wick 30 faces the tread 12; alternatively, the grooved surface of the wick 30 can face the tread 12 as shown in FIG. 7. After the tire casing has been retreaded, the wick 30 can be removed and reused in the retreading of another tire casing.

As illustrated in FIG. 1A, a pair of cloth extensions 56 can be attached to and extend from opposite ends of the pad 32. To this end, a slot 58 is formed adjacent each end of the pad 32 to permit one of the cloth extensions 56 to be secured to each end of the pad 32. As illustrated, each cloth extension 56 is threaded through one of the slots 58, is folded back onto itself, and is stitched.

The wick 30 is intended to be made in particular sizes which are proportional in size to a specified tire size. However, by way of example, and not by way of limitation, the pad 32 can have a length of about 19 inches, a width of about 6 inches, and a thickness of between about $1/16$ to $1/8$ inch. The fabric 34 is centered within the pad 32 and has a length of between 75% to 100% of the length of the pad 32 and a width of between 50% to 100% of the width of the pad 32. For instance, the fabric 34 is preferably multiple ply nylon cut to a length of 17 inches and a width of 3 inches. The grooves 42 of the wick 30 are formed in a repeating hexagonal pattern with each side of each hexagon extending approximately 1 inch. The depth of the grooves 42 are about half the thickness of the pad 32, for instance, the grooves 42 are preferably about 0.075 inches in depth. The width of each groove 42 is substantially equal to its depth.

Many alternative groove configurations, fabrics and dimensions can be utilized. For instance, the groove pattern in the wick 30 could be parallelograms instead of hexagons, and the fabric could be a material other than nylon.

The wick 30 can be manufactured using a pair of mold dies (not shown). One of the mold dies defines the smooth surface face of the wick and the other defines the grooved surface face of the wick 30. The mold die forming the grooved surface face of the wick 30 has a series of upstanding ribs for forming the grooves 42 in the wick 30.

A strip of unvulcanized rubber and a separate strip of fabric is placed between the mold dies which are then closed to compress the rubber and fabric. Heat is applied to the rubber such that the fabric sinks into the rubber and is embedded therein. The apertures 38 and 40 in the wick can be formed by the mold dies or can be cut into the finished molded wick 30. In addition, slots 58 can be formed adjacent the ends of the wick 30 for use in attaching cloth extensions 56.

While a preferred retreading wick 30 and method of manufacturing the wick have been described in detail, various modifications, alterations, and changes may be made without departing from the spirit and scope of the wick and method of manufacture according to the present invention as defined in the appended claims.

What is claimed is:

1. A wick for use in forming a vacuum between a curing envelope, a strip of new precured tread, and a tire casing having sidewalls during retreading of the tire casing, comprising a thin, elongate, elastomeric pad having opposite ends, a fabric material embedded therein, and a face with a plurality of grooves which form a plurality of air passageways, said pad being flexible and having a predetermined length between said opposite ends such that said pad is capable of conforming to the contour of the surface of the tire casing and new precured tread and is capable of being positioned on the tire casing such that said pad extends transversely across the new precured tread including the surface of grooves in the new precured tread with said opposite ends overlying and terminating on opposite sidewalls of the tire casing.

2. A wick according to claim 1, wherein said pad has an aperture for receiving a valve stem therethrough.

3. A wick according to claim 2, wherein said grooves form a grid network of air passageways throughout said entire face of said pad.

4. A wick according to claim 3, wherein said grid defines an array of closely-spaced geometric forms.

5. A wick according to claim 2, wherein said fabric material is a stretchable fabric.

6. A wick according to claim 5, wherein said fabric is made of a multi-ply knitted nylon.

7. A wick according to claim 5, wherein the length and width of said fabric material is no greater than the length and width of said pad.

8. A wick according to claim 7, wherein the length of said fabric material is at least 75% of the length of said pad, and wherein the width of said fabric material is at least 50% the width of said pad.

9. A wick according to claim 1, further comprising at least one cloth extension attached to at least one end of said pad.

10. A wick according to claim 1, wherein said wick has a second face opposite said face having said grooves, and wherein said second face has a smooth surface.

11. A wick according to claim 11, wherein said wick has a plurality of apertures extending between said faces.

12. A wick according to claim 1, wherein said face of said pad has a rectangular periphery.

13. A wick according to claim 12, wherein said pad has a maximum thickness in a range of about $1/16$ inch to about $1/8$ inch.

14. A tire retreading assembly comprising a wick, a tire casing having sidewalls, a strip of new precured tread, a curing envelope and a valve having a stem, said wick being located between the curing envelope and the tire casing and new precured tread, and being adjacent the valve stem which extends through the curing envelope for drawing a vacuum, said wick comprising:

an elongate pad of elastomeric material having a reinforcing, stretchable fabric material embedded therein and opposite ends;

said pad having a valve-stem-receiving aperture formed therein for engaging the stem of the valve;

said pad having a face with a plurality of interconnecting grooves formed therein for forming a network of air passageways to the valve; and said pad being thin, flexible and having a predetermined length between said opposite ends such that said pad is capable of conforming to the contour of the surface of the tire casing and new precured tread including the surface of grooves in the new precured tread and is positioned on the tire casing such that said pad extends transversely across the new precured tread with said opposite ends overlying and terminating on opposite sidewalls of the tire casing.

15. A tire retreading assembly according to claim 14, wherein said grooves have a depth substantially equal to half of the thickness of said pad.

16. A tire retreading assembly according to claim 15, wherein said grooves have a width substantially equal to said groove depth.

17. A tire retreading assembly according to claim 14, wherein said pad has an opposite face from said face having grooves, and wherein said opposite face has a smooth surface.

18. A tire retreading assembly according to claim 14, further comprising a pair of cloth extensions extending from said opposite ends of said pad.

19. A method of making a tire retreading wick used in forming a vacuum between a curing envelope and a tire casing and new precured tread, comprising the steps of:

placing unvulcanized rubber material between a pair of mold dies, one inner face of one of said mold dies having formed therein a series of upstanding ribs for forming a plurality of grooves in said rubber material when molded;

placing a fabric material between said mold dies;

closing said mold dies; and molding said tire retreading wick such that said grooves are formed in a face of said wick, said fabric material is embedded within said rubber material, and said wick is formed with a thickness which provides said wick with flexibility so that said wick is capable of conforming to the contour of the surface of the tire casing and new precured tread including the surface of grooves in the new precured tread when positioned transversely thereacross.

20. The method according to claim 19, wherein said series of upstanding ribs in said mold forms an interconnected network of grooves in said face of said tire retreading wick.

21. The method according to claim 20, further comprising the step of forming a plurality of apertures and slots in said wick.

* * * * *